United States Patent [19]

Thomas et al.

[11] 4,128,599

[45] Dec. 5, 1978

[54] POLYAMIDES FOR EXTRUSION APPLICATIONS

[75] Inventors: Norman W. Thomas, Warren; Frank M. Berardinelli, Millington, both of N.J.; Robert Edelman, Staten Island, N.Y.

[73] Assignee: Celanese Corporation, New York, N.Y.

[21] Appl. No.: 753,384

[22] Filed: Dec. 22, 1976

[51] Int. Cl.$^2$ .............................................. C08L 77/00
[52] U.S. Cl. .................................................. 260/857 R
[58] Field of Search ............. 260/857 R, 78 SC, 78 L, 260/77.5 SS

[56] References Cited

U.S. PATENT DOCUMENTS

| | | | |
|---|---|---|---|
| 3,015,652 | 1/1962 | Schnell | 260/78 L |
| 3,637,608 | 1/1972 | Schaaf | 260/78 L |
| 3,752,791 | 8/1973 | Zecher | 260/78 SC |
| 3,835,098 | 9/1974 | Brown | 260/75 N |

FOREIGN PATENT DOCUMENTS

| | | |
|---|---|---|
| 50-00044 | 6/1975 | Japan. |
| 1056202 | 1/1967 | United Kingdom. |

OTHER PUBLICATIONS

Preparation of Carbodiimides from Isocyanates, W. Neuman et al., Angew. Chem., vol. 1, (1962), No. 12, p. 625.
Chemical Abstracts; B. F. Goodrich, Neth. Appl. 6,506,325; vol. 64, No. 16,072h, (1966).

*Primary Examiner*—Paul Lieberman
*Attorney, Agent, or Firm*—Kenneth A. Genoni

[57] ABSTRACT

There is disclosed a process for preparing polycarbodiimide modified tractable polyamides having unique rheological properties which include increased melt strength and relative viscosity. These polycarbodiimide modified tractable polyamides are prepared by reacting the carboxyl end groups and to a lesser degree the amine end groups of tractable polyamides such as nylon 6,6, which are in a molten state with the polycarbodiimide groups of at least one polycarbodiimide such as poly(4,4'-diphenyl-methane carbodiimide) which both (a) is derived from at least one aromatic diisocyanate which is either unsubstituted or contains up to one methyl substituent on each aromatic ring, and (b) contains at least three carbodiimide units per polycarbodiimide molecule.

The resulting polycarbodiimide modified tractable polyamide has improved melt strength and relative viscosity and a decreased number of carboxylic acid and amine end groups. These improved melt strength polyamides also have improved die swell and shear sensitivity characteristics and are generally useful in extrusion applications such as blow molding.

12 Claims, No Drawings

POLYAMIDES FOR EXTRUSION APPLICATIONS

BACKGROUND OF THE INVENTION

In blow molding processes, molten resins must form into stable parisons for a time long enough to permit a mold to enclose the parison. If these molten polymers do not possess sufficient melt strength or melt viscosity, the extruded tube will tend to elongate or draw under its own weight so that the resulting blow molded article will have non-uniform wall thicknesses, low surface gloss, and poorly defined sample shape.

Polymers such as polyesters, polyamides, and polyacetals when melted, generally form thin liquids having low melt viscosities. These low melt viscosity materials are unsuited or are only poorly suited for the manufacture of extruded shapes, tubes, deep-drawn articles, and large blow molded articles. In order to overcome this disadvantage and to convert these polymers to a form better suited for the above-mentioned manufacturing techniques, it is known to add compounds to the plastics which will increase their melt viscosities. The materials which are added to increase the melt viscosity of the plastics are generally cross linking agents, as described, for example, in U.S. Pat. No. 3,378,532. Such cross linking agents may be added during the condensation reaction by which the plastics are formed, and/or to the plastics after their formation (prior to, or during their melting). Examples of cross linking agents which may be added to the plastics after their formation and before or after their melting in order to increase the melt viscosity include compounds containing at least two epoxy or isocyanate groups in the molecule, organic phosphorous compounds, peroxides, bishaloalkylaryl compounds, and polyesters of carbonic acid.

These known cross linking agents which are added to increase the melt viscosity of the polymer are not completely satisfactory. They may, for instance, cause an excessively rapid and large increase in viscosity of form reaction products which have an adverse influence on the quality of the plastics. Furthermore, the results obtained with the use of these known cross linking agents are not always uniform or reproducible. For example, when polyesters of carbonic acid are used to increase the melt viscosity, the degree of viscosity increase is generally dependent not only upon the amount of additive used but also upon its molecular weight and on the state of the polycondensation reaction at which the addition takes place.

It has been observed that besides having sufficient melt viscosity or melt strength, polymers which are to be used in blow molding and related applications should also possess in certain instances sufficient die swell, i.e., the molten polymer should expand as it is released from the extrusion die. This die swell is important for blow molding applications where containers having a handle present thereon are to be formed.

It has been further observed that polymers having low relative viscosities are particularly difficult to blow mold and are also unsuited for many other related applications.

It has been still further observed that polymers which are utilized in blow molding applications should also possess a high degree of shear sensitivity, i.e., the molten polymer should thin out and become less viscous upon the application of increasingly higher rates of shear.

A shear sensitive polymer is more easily processed through an extruder and aids in providing an efficient blow molding process. Thus, a polymer having the combination of enhanced relative viscosity and shear sensitivity may be readily extruded (while being subject to a high degree of shear) and thereafter evidence a high degree of stability in the parison as a result of the high relative viscosity and reduced shear present therein.

Thus, although the prior art illustrates the use of numerous additives to modify various properties of certain polymers, the search has continued for improved processes for improving certain rheological properties of these polymers, particularly, the melt strength and shear sensitivity such that these polymers may be useful in blow molding and related applications.

For polyesters, this search has culminated in U.S. patent application Ser. No. 715,946, filed Aug. 19, 1976, now U.S. Pat. No. 4,071,503 by the same inventors of the present application, namely, N. Thomas, F. Berardinelli and R. Edelman which is herein incorporated by reference and which is a continuation-in-part application of U.S. patent application Ser. No. 558,982, filed Mar. 17, 1975, now abandoned.

In the former application, a process is provided for preparing a polycarbodiimide modified thermoplastic polyester of increased melt strength and intrinsic viscosity, which process comprises incorporating into a thermoplastic saturated polyester, having at least one carboxyl end group, at least one polycarbodiimide which polycarbodiimide both (a) is derived from at least one aromatic diisocyanate which is either unsubstituted or contains up to one methyl substituent on each aromatic ring, and (b) contains at least three carbodiimide units per polycarbodiimide molecule, by reacting the carboxyl end group of the polyester while in the molten state with the carbodiimide groups of the polycarbodiimide.

Thus, the present invention seeks to modify polyamide containing compositions to obtain properties comparative to those obtained by a similar modification of polyesters with polycarbodiimides.

Also, U.S. Pat. No. 2,284,896 discloses a process for reacting a broad class of compounds, some of which may include carbodiimide groups with an organic substance having a plurality of groups containing a reactive hydrogen. This patent does not, however, specifically disclose the reaction between a polyamide and a polycarbodiimide of the type described herein.

OBJECTS AND SUMMARY OF THE INVENTION

Accordingly, a general object of the present invention is to avoid or substantially alleviate the above problems of the prior art.

A more specific object of the present invention is to provide a process for preparing improved polyamide compositions of improved melt strength and shear sensitivity characteristics.

Another object of the present invention is to provide a process for preparing improved polyamide compositions useful in extrusion applications.

A further object of the present invention is to provide a process for preparing polyamide compositions having improved die swell and relative viscosity characteristics.

Still another object of the present invention is to provide the improved polyamide compositions prepared by these processes.

It is also an object of the present invention to provide an improved polyamide extrusion process utilizing these improved polyamides.

Other objects and advantages of the invention will become apparent from the following summary and description of the preferred embodiments of the present invention.

In one aspect, the present invention provides a process for preparing polycarbodiimide modified tractable polyamides of increased melt strength and shear sensitivity. This process comprises incorporating into the structure of a tractable polyamide having at least one carboxyl end group and at least one amine group, at least one polycarbodiimide which both (a) is derived from at least one aromatic diisocyanate which is either unsubstituted or contains up to one methyl substituent on each aromatic ring, and (b) contains at least three carbodiimide units per polycarbodiimide molecule by reacting the end groups of said polyamide while in the molten state with the carbodiimide group of the polycarbodiimide.

In another aspect, the present invention provides the polycarbodiimide-modified tractable polyamide produced by this process.

In still another aspect, there is provided an improved molding process which comprises forming a melt of the above-described polycarbodiimide-modified tractable polyamide into a desired article and cooling the molten polycarbodiimide-modified tractable polyamide.

The essence of the present invention is the discovery that a limited group of polycarbodiimides will react with the carboxyl end groups and to a lesser degree the amine end groups of tractable polyamides causing chain branching of said polyamides with the result that the polyamide reaction products have increased melt strength and shear sensitivity, i.e., the molten polymer becomes less viscous upon the application of increasingly higher rates of shesr and a decreased number of carboxylic acid and amine end groups.

The polycarbodiimide modified tractable polyamides prepared according to the process of the present invention also have improved die swell characteristics, i.e., after extrusion of the molten polyamides through an orifice having a particular diameter the diameter of the extruded polyamide may increase up to about two or three times the diameter of the extrusion orifice, as well as improved relative viscosity.

DESCRIPTION OF THE PREFERRED EMBODIMENTS

As indicated hereinafter, the process of the present invention comprises reacting tractable polyamides, while in a molten state, with a polycarbodiimide to form improved polyamides having increased melt strength and shear sensitivity.

Any tractable polyamide which is capable of being reacted in the molten state may be used in the process of the present invention.

The polyamides which may be reacted with the polycarbodiimides described herein may be any tractable polyamide which contains at least one carboxyl end group and at least one amine end group. The term "tractable" polyamide is meant to include those polyamides which have a glass transition temperature (Tg) below their thermal decomposition temperature.

As is recognized by those skilled in polymer technology, a glass transition temperature is the temperature at which the structure of a wholly or partially amorphous polymeric material changes from a vitreous state to a viscoplastic state. The glass transition temperature of a given polymer sample conveniently may be determined utilizing conventional thermoanalytical techniques. For instance, when a shaped polymer test specimen is subjected to continuous measurement of its thermal expansion (or contraction) by progressively increasing (or decreasing) the temperature, it commonly is seen that a significant increase (or decrease) in the specimen length takes place suddenly at a given temperature, i.e., at the so-called glass transition temperature or point. This measurement is commonly termed thermomechanical analysis and may be carried out with commercially available instruments. For instance, a Thermomechanical Analyzer, Model No. 990, manufactured by DuPont, was used for the glass transition temperature measurements referred to in the present application.

The tractable polyamides useful in the process of the present invention may be formed in a multitude of ways as are well known to those skilled in the art.

The term "polyamide" as used herein refers to a polymer wherein the repeating units are linked by an amide group, i.e., the

radical wherein R is hydrogen or lower alkyl (e.g., 1 to 8 carbon atoms); the nitrogen and carbon atom of each repeating amide radical being directly attached to a carbon atom of a radical derived from suitable carboxylic acids and amines.

Thus, polyamides which are suitable for use in accordance with the present invention include homopolyamides obtained by the polymerization of amino acids such as ε-amino caproic acid, 11 - amino undecanoic acid, 9 - aminononanoic acid.

Alternative and more preferred polyamides may be obtained by condensing a diamine with a dicarboxylic acid. Suitable diamines, for example, include ethylene diamine, hexamethylene diamine, decamethylene diamine, dodecamethylene diamine, 2,2,4- or 2,4,4-trimethylenehexamethylene diamine, p- or m-xylylene diamine, bis-(4-amino cyclohexyl)-methane, 3-amino methyl-3,5,5-trimethyl cyclohexyl amine or 1,4-diaminomethyl cyclohexane.

Suitable dicarboxylic acids include sebacic acid, heptadecanodicarboxylic acid, adipic acid, 2,2,4- or 2,4,4-trimethyl adipic acid, isophthalic acid and terephthalic acid.

Particularly preferred polyamides include polyhexamethyleneadipamide (i.e., nylon 6,6), polyhexamethylenesebacamide (i.e., nylon 610) and polycaprolactam (i.e., nylon 6).

The polycarbodiimides which may be used in the present invention are selected from a particularly defined group. Not all polycarbodiimides will increase the shear sensitivity, relative viscosity and especially the melt strength of polyamides when reacted with the polyamide while in the molten state such that the resulting polyamide product is not deleteriously influenced by the high reaction temperatures employed and may be useful in extrusion applications. It has been found that only those polycarbodiimides which both (a) are derived from at least one aromatic diisocyanate which is either unsubstituted or contains up to one methyl substituent on each aromatic ring, and (b) contains at least three carbodiimide units per polycarbodiimide molecule will achieve the desired result.

Aromatic diisocyanates which are more heavily substituted result in polycarbodiimides which are not sufficiently reactive to provide the desired rate of reaction with the polyamide.

As discussed hereinafter, a low rate of reaction necessarily extends the period of time at which the polyamide and polycarbodiimide are maintained at the elevated temperatures employed (e.g., about 250° to 300° C.) during the reaction which in turn may lead to polymer degradation.

Polycarbodiimides having less than three carbodiimide units per polycarbodiimide molecule when contacted with the polyamide result only in chain extension of the polyamide without a significant amount of branching.

Although the increase in melt strength of the modified polyamide may be attributable, in part, to the increase in relative viscosity of the modified polyamide, an additional and proportionally greater improvement in melt strength may be attributed to the chain branching and broadening of molecular weight distribution which occurs as a result of the particular reaction herein described. Such chain branching is also responsible to a significant degree for the improvements in die swell and shear sensitivity. Thus, chain branching is necessary in order to obtain improved melt strength, die swell, and shear sensitivity.

The polycarbodiimide should be such that it is miscible with the polyamide which is in the molten state. The polycarbodiimides useful in the present invention may have number average molecular weights of generally from about 450 to about 10,000, typically from about 800 to 8,000, and preferably from about 1,000 to about 6,500. Polycarbodiimides having molecular weights greater than about 10,000 may not dissolve in the polyamide melt and thus may not be useful in the present invention.

Specific examples of polycarbodiimides which are useful in the present invention include poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide) and mixtures thereof. Preferred polycarbodiimides include poly(tolyl carbodiimide), poly(4,4'-diphenylmethane carbodiimide) and mixtures thereof.

The polycarbodiimides may be formed in any manner known to those skilled in the art, for example, by heating the aromatic diisocyanate compounds defined above in the presence or absence of solvent. The formation of the polycarbodiimide is accompanied by the evolution of carbon dioxide gas and the substantial elimination of any free isocyanate groups.

Although the polycarbodiimides useful in the present invention may be prepared without the use of a catalyst, much higher temperatures (ca. 300° C.) are needed in the absence of a catalyst. For certain polycarbodiimides, the use of such high temperatures may result in the formation of large quantities of side products and colored products. Thus, the polycarbodiimides may be typically prepared by heating the isocyanates in the presence of a catalyst such as the phosphorous containing catalysts described in U.S. Pat. Nos. 2,853,473; 2,663,737; and 3,775,242, and also in Monagle, 27 J. Org. Chem. 3851 (1962). Phospholine oxides such as those described in Campbell et al, 84 J. Amer. Chem. Soc. 3673 (1962) are preferred catalysts. A particularly preferred catalyst is 1-ethyl-3-methyl-3-phospholine-1-oxide.

The polycarbodiimide formation reaction is preferably carried out under an atmosphere of argon or other dry inert gas so as to minimize the amount of water which may be in contact with the reactants since isocyanates tend to react rapidly with water at elevated temperatures.

Aromatic diisocyanates which may be used in preparing the desired polycarbodiimides include, for example, toluene diisocyanate, 4,4'-diphenylmethane diisocyanate, 3,3'-dimethyl-4,4'-biphenylene diisocyanate, p-phenylene diisocyanate, m-phenylene diisocyanate, 3,3'-dimethyl-4,4'-diphenylmethane diisocyanate and mixtures thereof.

Preferred aromatic diisocyanates are toluene diisocyanate, 4,4'-diphenylmethane diisocyanate, and mixtures thereof.

The aromatic diisocyanates are preferably employed in an essentially pure state but may contain minor amounts (i.e., less than about 2% by weight) of other compounds such as ureas, amines, and traces of water and/or acid. The term "toluene diisocyanate" is meant to include 2,4-toluene diisocyanate, 2,6-toluene diisocyanate, or any combination of these isomers. Mixtures of the 2,4- and 2,6- isomers typically contain either 80 parts by weight 2,4-toluene diisocyanate and 20 parts by weight of 2,6-toluene diisocyanate or 65 parts by weight 2,4-toluene diisocyanate and 35 parts by weight 2,6-toluene diisocyanate.

Small amounts (i.e., 50% by weight or less) of aromatic monoisocyanates may also be used in conjunction with the aromatic diisocyanates in the preparation of the polycarbodiimides which are employed in the process of the present invention. These monoisocyanates help control the molecular weight and viscosity of the resulting polycarbodiimides. The amount of aromatic monoisocyanate used depends upon the particular diisocyanate employed, but generally from about 20 to about 50, typically from about 25 to about 45, and preferably from about 30 to about 40% by weight of the monoisocyanate and correspondingly generally from about 50 to about 80, typically from about 55 to about 75, and preferably from about 60 to about 70% by weight of diisocyanate based upon the total weight of the isocyanate compounds may be employed.

Aromatic monoisocyanates which may be used in this way include, for example, p-chlorophenyl isocyanate, m-chlorophenyl isocyanate, phenyl isocyanate, p-methyldiphenyl isocyanate, m-methoxyphenyl isocyanate, p-tolyl isocyanate, m-tolyl isocyanate, o-tolyl isocyanate, p-nitrophenyl isocyanate, m-nitrophenyl isocyanate, 2,6-diethylphenyl isocyanate, and mixtures thereof.

Phenyl isocyanate, p-chlorophenyl isocyanate, m-chlorophenyl isocyanate and mixtures thereof are preferred monoisocyanates for use in the present invention.

Monoisocyanates alone may not be used to prepare the polycarbodiimides since polymeric carbodiimides would not result from the heating of monoisocyanates alone.

The reaction which takes place between the polyamide (e.g., polyhexamethyleneadipamide) and the polycarbodiimide which results in the properties described herein may be summarized by the following:

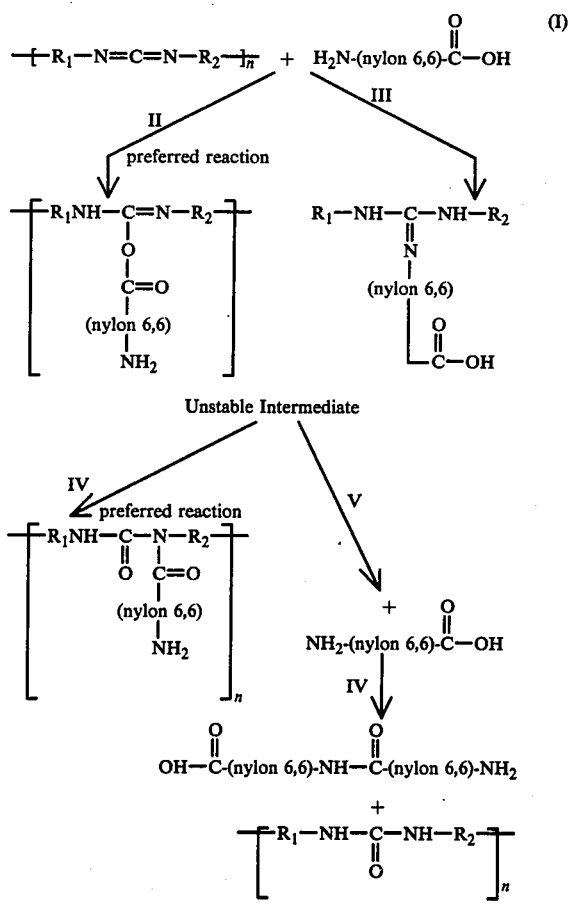

The above representation is provided to illustrate that the predominant mode of reaction which is primarily responsible for the observed properties takes place between the carboxyl end group of the polyamide and the carbodiimide group (i.e., — N = C = N —) of the polycarbodiimide to form an unstable intermediate. This intermediate subsequently rearranges (see equation II to form an acylurea, i.e.,

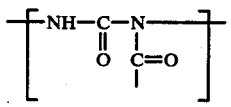

containing structure. The presence of at least three carbodiimide groups on each polycarbodiimide molecule (not illustrated herein for ease of presentation) results in a repetition of the acylurea linkage and accompanying polyamide group thereby forming a highly branched backbone structure which is believed to account for the improved above described properties.

The polycarbodiimide will also react with an amine end group of the polyamide (see Equation III) although such reaction will proceed at a slower rate and therefore to a lesser extent than the predominant reaction (i.e., reaction II) as evidenced by the smaller decrease in amine end groups. The predominate acylurea forming reaction occurs at an extremely rapid rate and therefore permits the utilization of periods of extremely short duration during which the reaction mixture is maintained at elevated temperatures. Although the amine based reaction does not have sufficient time to occur to a comparable degree it is believed to contribute to some extent to the above-described properties since it results in chain branching.

The unstable intermediate may possibly also react, to a far lesser degree if at all, will another polyamide molecule (see equation V) in an amidation type of reaction to form a polyamide of slightly higher molecular weight and relative viscosity and to convert the original carbodiimide group to a urea group. Although this reaction may possibly account, to some extent, for a slight increase in relative viscosity of the modified polyamide as a whole it does not play a significant role in the observed improvement in melt strength and particularly die swell and shear sensitivity since no chain branching would occur as a result therefrom.

The amount of tractable polyamide and of polycarbodiimide employed to obtain the desired product is generally from about 95 to about 99.5 (e.g., 95 to 99%), typically from about 96 to 98.5, and preferably from about 97 to 98.5% by weight tractable polyamide and correspondingly generally from about 0.5 to about 5% (e.g., about 1 to about 5%), typically from about 1.5 to about 4%, and preferably from about 1.5 to about 3% by weight of polycarbodiimide. The expressed percentages are by weight of the total reaction mixture (i.e., total weight of polyamide and polycarbodiimide).

Amounts of polycarbodiimide in excess of about 5% by weight of the total reaction mixture may result in polyamides having extremely high viscosity. Amounts of polycarbodiimide below about 0.5% yield negligible improvements in the observed properties.

The amide groups present in the polyamide are subject to attack and degradation by water molecules under conditions encountered in molding. Therefore, to prevent such degradation, the polyamide should be dried either before or after the reaction with the polycarbodiimide and before molding the polycarbodiimide modified polyamides. If the drying temperatures utilized are too high, discoloration may result.

Effective drying may be achieved by heating the polyamide before reaction or the polycarbodiimide modified polyamide to a temperature below melting either under reduced pressure or under a sweep of inert gas such as nitrogen, helium, or carbon dioxide.

Suitable drying temperatures may range from about 75° to about 250° C. preferably from about 75° to about 200° C. and most preferably from about 80° to about 150° C. Drying temperatures substantially in excess of about 150° C. may result in discoloration. The period during which the polyamide is dried should be sufficient to remove substantially all of the water therefrom and may vary from about 2 to about 48 hours depending on the temperatures and pressure utilized as may be determined by one skilled in the art.

Other additives, both polymeric and non-polymeric, such as flame retardants, lubricity agents, dyes, antioxidants, and inorganic fillers (such as glass) may be employed as long as these additives do not interfere with the reaction between the polycarbodiimides and polyamides. Such additives may generally be present in amounts up to about 30% by weight of the total reaction mixture.

The polyamide and polycarbodiimide to be reacted may be mixed or blended in any convenient manner as long as the polycarbodiimide is in contact with the polyamide while it is in the molten state for a period of time sufficient for the above-described chemical reaction to occur. Thus, solid pulverized polycarbodiimide additive may be dry blended with solid polyamide chip and then fed to a melt screw extruder (such as Werner-Pfleiderer ZSK twin screw extruder) which is at a temperature high enough to cause the polyamide to melt. The polycarbodiimide dissolves in the polyamide melt and thus reaction between the polyamide and the polycarbodiimide may take place. Alternatively, the polyamide may be milled until fully molten in a plastograph (such as a C. W. Brabender Plasti-Corder) at temperatures high enough to melt the polyamide. At that time, the solid polycarbodiimide may be dissolved directly in the molten polyamide until a torque level of generally from about 200 to about 1600 typically from about 250 to about 1500 and preferably from about 270 to about 1400 meter-grams is achieved.

By "torque level" is meant the work done in processing materials in a plastograph, such as a C. W. Brabender Rolle Type Plastograph. "Torque level" is measured by a chart recorder in units of meter grams. The magnitude of the torque level depends upon the amount and kind of polycarbodiimide used, the relative viscosity, number of carboxylic acid and amine end groups, and moisture level of the particular polyamide employed. A low torque level may be achieved by lowering the relative viscosity, increasing the number of carboxylic acid end groups or amine end groups, and/or increasing the percent moisture content of the polymer, assuming a fixed amount of polycarbodiimide, a fixed milling time, and a fixed amount of total charge. A low torque level may also be achieved by using smaller amounts of polycarbodiimide. Higher torque levels may be achieved by using larger amounts of polycarbodiimide, or by using higher relative viscosity, lower moisture content, and/or lower amounts of carboxylic acid and amine end groups in the particular polyamide.

The present process may be carried out at any temperature which is such that the polyamide will remain in the molten state for a period of time sufficient to enable the above-described reaction between the polyamide and the polycarbodiimide to take place. The reaction temperature should be high enough so that the polyamide is in a molten state but no so high as to decompose the polyamide or polycarbodiimide. At atmospheric pressure, the reaction may be carried out at a temperature of generally from about 250° to 300° C., typically from about 250° to about 290° C., and preferably from about 280° to about 290° C.

Although pressures may vary widely, and subatmospheric, atmospheric and superatmospheric pressures may be used, substantially atmospheric pressure is preferred.

The molten polyamide and the polycarbodiimide must be in contact at the elevated temperatures employed for a time sufficient for the above-described chemical reaction to take place but insufficient to deleteriously influence the resulting product.

Ordinarily the resulting reaction product, which contains acylurea linkages which are unstable at elevated temperatures, evidences a limited stability at the reaction temperatures employed and excessive reaction times would result in significant degradation of product polymer structure. It is therefore a unique characteristic of the present invention that the rapid rate of the above-described, acylurea forming reaction, permits the utilization of the relatively high temperatures necessary to achieve the desired reaction while at the same time preserving the polymer integrity of the resulting modified polyamide product. The progress of the reaction may be monitored by observing the decrease in carboxylic acid end groups (CEG) and amine end groups (AEG) with time.

When no further decrease in CEG takes place, reaction has ceased. Of course reaction time is a function of temperature, and in the present process, a reaction time of generally from about 1 to about 8 minutes, typically from about 1 to about 5 minutes, and preferably from about 2 to about 4 minutes (melt screw extruder) is usually sufficient to obtain the desired product. Because mixing does not take place to as great a degree in a plastograph as in a melt screw extruder, reaction times in the plastograph are generally somewhat longer and less preferred.

The materials of course may be reacted on a batch, continuous, or semi-continuous basis as desired.

As discussed above, the objects of the present invention are achieved by a specific chemical reaction which occurs between the carboxyl end groups and to a lesser extent the amine end groups of the polyamide and the carbodiimide groups of the polycarbodiimide. This reaction is evidenced by an increase in relative viscosity (RV), melt strength, and shear sensitivity, as well as a concomitant decrease in the CEG and AEG level of the resulting modified polyamide.

The increase in melt strength and concomitant increase in RV and decrease in CEG and AEG result from chain branching of the polyamide and an accompanying increase in molecular weight and molecular weight distribution which chain branching occurs when the polyamide and polycarbodiimide are reacted in the manner described.

The increase in shear sensitivity is a further indication that chain branching occurs since chain branching is known to induce a broad molecular weight distribution in the resulting polymer which is generally accompanied by shear sensitive behavior.

As indicated hereinabove, the present process provides polycarbodiimide modified tractable polyamides having increased melt strength and relative viscosity which polyamides are useful in extrusion applications. Such applications include pipe, film, and blow molding uses such as in blow molding bottles.

Melt strength (MS) may be defined as follows:

$$MS = T_1/T_2$$

wherein $T_1$ equals the time necessary to extrude the first 3 inches of a 6 inch continuous strand of molten polyamide, and $T_2$ equals the time necessary to extrude the second 3 inches of the 6 inch continuous strand. Melt strength may be measured by extruding the 6 inch strand through a constant drive melt index apparatus with a constant drive piston moving at 0.25 inches per minute, at a temperature high enough to keep the polyamide molten (e.g., about 270° C. for polyhexamethyleneadipamide). A melt strength value of from about 1.0 to about 2.0 is desirable when the material is to be used in certain extrusion applications such as blow molding. Ideally, the value of 1.0 is desired since this would mean that the second three-inch portion is extruded at the same rate as the first.

For polyamides with a poor or low melt strength, the second segment is extruded much more rapidly than the first segment, resulting in a $T_1/T_2$ ratio significantly greater than 1.0.

Thus, polyamides having poor or very low melt strengths have rather large values of $T_1/T_2$. By saying that certain polyamides have "no melt strength" is meant that the second segment of the six-inch strand is extruded so rapidly that $T_2$ cannot be measured.

The term "high melt strength polyamides" refers to polyamides having a ratio of $T_1/T_2$ approaching the ideal value of 1.0, and the terms "poor" or "low melt strength polyamide" refer to polyamides having comparatively large $T_1/T_2$ ratios. Polyamides having "no melt strength" have so small a $T_2$ value that the melt strength cannot be measured.

The improved polyamides of the present invention have melt strengths of generally less than about 1.8 (e.g., about 1.76), typically less than about 1.4 and preferably less than about 1.2 (e.g. about 1.11) at 270° C.

The improved melt strength polyamides of the present invention also have improved die swell characteristics. Die swell may be described as the increase in diameter which takes place when molten polyamide is released from an extrusion die. As the polymer moves through the die, the entanglements and cross links of the polymer chains are deformed or displaced from their equilibrium positions. This represents a storage of elastic energy. As the polymer is released from the die, this energy is regained by a return of the entanglements and cross links to their equilibrium positions. This results in die swell.

The diameter of the improved melt strength polyamides of the present invention may increase up to about two or three times the diameter of the extrusion orifice. Die swell is important for blow molding applications since (a) the larger the diameter of the extruded polymer, the easier it is for air to be blown into the melt, and (b) the greater the die swell, the greater the expansion of the polyamide to fit the particular mold.

The improved melt strength polyamides of the present invention also have increased relative viscosities.

The "relative viscosity" of the polyamides of the present invention is determined by measuring the viscosity of a polymer solution of specified percent concentration and dividing the resulting value by the viscosity of the solvent alone. The viscosity of the polymer solution is determined by obtaining the effluent time ($t$) it takes a specified volume of the polymer solution to flow through a capillary tube of a capillary viscometer. The time it takes the same volume of solvent alone to flow through the same capillary tube is expressed as ($t_o$). The "relative viscosity" is then determined from the relationship of $t$ and $t_o$ in accordance with the formula Relative Viscosity ($\eta_r$) = $\eta/\eta_o \approx t/t_o$ where $\eta$ is the viscosity of the polymer solution and $\eta_o$ is the viscosity of the solvent alone. Thus, "relative viscosity" of the polyamides of the present invention may be conveniently determined by measuring the viscosity of a solution (e.g., 3% and 11%) of the polyamide in formic acid in accordance with the above described method. The 11% relative viscosity of the improved polyamides of the present invention is generally from about 75 to about 600, typically from about 100 to about 500, and preferably from about 200 to about 400.

By "carboxylic acid end groups" is meant the number of carboxylic acid end groups present in the polymer, measured in microequivalents/gram polymer. By "amine end groups" is meant the number of amine end groups present in the polymer measured in microequivalents/gram polymer. The number of carboxylic acid end groups may be measured by dissolving the polymer in a 70/30 mixture of o-cresol/chloroform solvent and potentiometrically titrating this solution with tetrabutylammonium hydroxide. The number of amine end groups may be measured by dissolving the polymer in a phenol-methanol mixture (i.e., 68% phenol in methanol) and potentiometrically titrating this solution with aqueous hydrochloric acid or perchloric acid.

The improved polyamides of the present invention may contain generally less than about 50, typically less than about 30, and preferably less than about 20 microequivalents of carboxylic acid end groups per gram of polyamide.

The polyamides of the present invention may also contain generally less than about 40, typically less than about 35, and preferably less than about 30 microequivalents of amine end groups (AEG) per gram of polyamide.

Preferably, the polyamides which may be utilized in the present invention possess a stoichiometric balance between the number of amine end groups and carboxylic acid end groups.

The present invention is further illustrated by the following examples. All parts and percentages in the examples as well as in the specification and claims are by weight unless otherwise specified.

EXAMPLE I

This example illustrates the preparation of the polycarbodiimide modified tractable polyamides of the present invention. Runs 1, 2 and 3 illustrate the effect of various concentrations of (4,4'-diphenylmethane carbodiimide) on polyhexamethylenedipamide while run 4 utilizes the unmodified polyhexamethyleneadipamide and illustrates the effect of omitting the polycarbodiimide altogether.

The details of the reaction for runs 1 through 3 are as follows:

Before reaction the linear polyhexamethyleneadipamide having an 11% formic acid relative viscosity value of 48 is dried at 90° C. for 24 hours in a vacuum oven.

The pulverized, dry polycarbodiimide is tumble blended at the indicated weight percent levels of ¼, ½ and 1% with the dry polyhexamethyleneadipamide pellets. Said pellets have an initial relative viscosity of 6, and 48 utilizing 3% and 11% formic acid solutions respectively, and about 74 microequivalents of carboxylic acid end groups per gram of the polyamide and about 47 microequivalents of amine end groups per gram of polyamide. The melt flow of the unmodified polyamide is too rapid to allow accurate measurement of the initial melt strength. The mixture of polyhexamethyleneadipamide and polycarbodiimide is fed into a Werner-Pfleiderer ZSK twin screw extruder with an intensive mixing screw configuration with kneading blocks.

The melt temperature is approximately 295° C. and the reaction is carried out under substantially atmospheric pressure. The results of these runs are indicated in Table I below.

TABLE I

| Run No. | 1 | 2 | 3 | 4 |
|---|---|---|---|---|
| polycarbodiimide | A | A | A | — |
| derived from | B | B | B | — |
| amount (% by wt.) | ¼ | ½ | 1 | 0 |
| blending technique | C | C | C | — |

TABLE I-continued

| Run No. | 1 | 2 | 3 | 4 |
|---|---|---|---|---|
| melt strength at 270° C | D | 1.76 | 1.11 | D |
| relative viscosity | | | | |
| (3% HCOOH) | 7 | 9 | 15 | 6 |
| (11% HCOOH) | — | 108 | 309 | 48 |
| carboxylic acid end groups | — | 43 | 18 | 74 |
| amine end groups | — | 27 | 31 | 47 |

A: poly(4,4'-diphenylmethane carbodiimide)
B: 4,4'-diphenylmethane diisocyanate
C: dry blending of solid polyamide and polycarbodiimide compound, followed by feeding this mixture into an extruder at elevated temperatures so that the polyamide becomes molten and chemical reaction between the polyamide and polycarbodiimide takes place.
D: the melt flow is too rapid to allow accurate measurement of the initial melt strength.

EXAMPLE II

This example illustrates the properties of specimens molded from the products obtained by runs 1 to 4 of Example I.

The branched polycarbodiimide modified polyamides of runs 1 to 3 of Example I as well as unmodified linear polyhexamethyleneadipamide are again dried at 90° C. in a vacuum oven for 24 hours and injection molded on a Stubbe extruder. The molding conditions and specimen properties are shown in Tables II and III.

In Tables II and III "unmodified" refers to polyhexamethyleneadipamide which is not reacted with polycarbodiimide and "modified" refers to polyhexamethyleneadipamide which is reacted with polycarbodiimide.

From Table III, it can be seen that notched izod impact strength increases with increasing level of polycarbodiimide. The improvement is quite significant, i.e., a ¼% of polycarbodiimide improves the impact strength from 0.94 to 1.26.

In general, the tensile and flexural properties of the modified and unmodified nylons are approximately equivalent. Elongation at break, however, appears to increase with increasing PCDI level with the exception that the value for the linear control is somewhat higher than for the ¼% PCDI level.

TABLE II
INJECTION MOLDING CONDITIONS FOR MODIFIED AND UNMODIFIED NYLON 6,6

| | Unmodified Nylon 6,6 Control | PCD I Level in Modified Nylon 6,6 | | |
|---|---|---|---|---|
| | | ¼% | ½% | 1% |
| Cylinder Temp. (° C) | 270 | 270 | 270 | 270 |
| Mold Temp. (° C) | 80 | 80 | 80 | 80 |
| Cycle Time (sec.) | 32 | 32 | 32 | 32 |
| Screw RPM | 80 | 80 | 80 | 80 |
| Injection Press. (psi) | 5,000 | 8,500 | 11,000 | 20,000 |

Nylon 6,6 = polyhexamethyleneadipamide

TABLE III
PROPERTIES OF INJECTION MOLDED NYLON 6,6 SAMPLES

| | Unmodified Nylon 6,6 Control | PCD I Level in Modified Nylon 6,6 | | |
|---|---|---|---|---|
| | | ¼% | ½% | 1% |
| Nylon Type | Linear | Branched | Branched | Branched |
| Tensile Properties | | | | |
| Yield Strength (psi) | 10,500 | 10,800 | 11,100 | 10,600 |
| Break Strength (psi) | 9,580 | 10,800 | 9,440 | 10,600 |
| Elong. at Break (%) | 36.2 | 24.9 | 48.4 | 53.3 |
| Flexural Strength (psi) | 14,200 | 14,200 | 14,400 | — |
| Flexural Modulus (psi) | $.371 \times 10^6$ | $.366 \times 10^6$ | $.365 \times 10^6$ | — |
| Izod Impact Notched (ft.-lb./in of notch) | .94 | 1.11 | 1.26 | 1.26 |
| Reverse Notched (ft.-lbs./in of notch) | 3 out of 5 No break | 3 out of 5 No break | 4 out of 5 No break | 2 out of 2 No break |
| Un-Notched (ft.-lbs./in) | — | 2 out of 5 No break | 5 out of 5 No break | — |
| Rockwell Hardness | 80M | 84M | 82M | 79M |
| Heat Deflection Temp (° C) (at 264 psi) | 67 | 69 | 69 | — |
| Voids | | NONE | | |

Nylon 6,6 = polyhexamethyleneadipamide

EXAMPLE III

This example illustrates the preparation of a polycarbodiimide which is used in the preparation of a polycarbodiimide-modified tractable polyamide of the present invention. The particular polycarbodiimide used is the reaction product of an aromatic diisocyanate and an aromatic monoisocyanate.

A 500 milliliter resin reaction flask is fitted with a gas inlet tube, magnetic stirrer bar, and a condenser (Graham spiral loop) at the top of which the gas inlet tube leads to a bubbler for observing gas evolution. Toluene diisocyanate (105 grams), p-chlorophenyl isocyanate (62.1 grams) and bis(β-chloroethyl) vinyl phosphonate (13 grams) are added to the flask. The bis(β-chloroethyl vinyl)phosphonate is commercially available from the Stauffer Chemical Co. under the trade name Fyrol Bis Beta and is used as a catalyst in the present reaction.

Argon is passed copiously over the surface of the reactants. The flask containing the reactants is lowered into an oil bath at about 190° C. (internal reaction temperature of between about 170° and 180° C.). Argon is continuously passed over the reactants at a slow rate while the reaction is taking place.

Within minutes after immersion, bubbles of carbon dioxide may be observed by the clouding of a lime water solution. The reaction is continued for about 4 hours until a foamed material forms in the flask. Heating is continued for an additional period of time until the foam fills most of the flask. Argon is passed rapidly over the surface during this period. Heating is then stopped and the flask is allowed to cool under an argon atmosphere. The reaction vessel containing the product is then weighed and a loss of about 20% is observed. The foamed material is quite friable and is readily chipped out. The remaining deep red material may also be chipped out or removed by softening with acetone. The product shows a small peak in the infrared (IR) for isocyanate (4.4μ), a large peak for carbodiimide (4.7μ), and a substantial peak which is probably polymerized carbodiimide (6.0μ). The carbodiimide and polymerized carbodiimide combined material comprise about 90 to 95% of the product.

This product is further purified by heating under vacuum in an oil bath at 205° C. for 2½ hours. Loss in weight is variable with about 15% of the material being removed. The final product shows no isocyanate by IR. Purification also appears to remove virtually all of the catalyst since phosphorous levels are less than 0.1%.

The polycarbodiimide product is reacted with polyhexamethyleneadipamide in a manner similar to that of run 1 of Example I and similar results are achieved.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A process for preparing a polycarbodiimide modified tractable polyamide of increased melt strength, shear sensitivity and relative viscosity, from a reaction mixture of a tractable polyamide and at least one polycarbodiimide which process comprises incorporating into the structure of, from about 99.5 to about 95% by weight of said mixture, of a tractable polyamide, having at least one carboxyl end group and at least one amine end group, from about 0.5 to about 5% by weight of said mixture of, at least one polycarbodiimide which polycarbodiimide both (a) is derived from at least one aromatic diisocyanate which is either unsubstituted or contains up to one methyl substituent on each aromatic ring, and (b) contains at least three carbodiimide units per polycarbodiimide molecule, by reacting the end groups of the polyamide, at a temperature not less than the melting point of the polyamide and less than the decomposition temperature of the polyamide and polycarbodiimide, with the carbodiimide groups of the polycarbodiimide, said modified tractable polyamide having a melt strength ratio of $T_1/T_2$, wherein $T_1$, is the time necessary to extrude a first three inch portion of a six inch continuous strand of molten polyamide, and $T_2$ is the time necessary to extrude the second three inches of the six inch continuous strand, of less than about 1.76 at 270° C., a relative viscosity, as determined from an 11%, by solution weight of a solution of the polyamide in formic acid, of about 75 to about 600 and utility in extrusion applications.

2. The process of claim 1 wherein the reaction is carried out at a temperature of from about 250° to about 300° C. and at substantially atmospheric pressure.

3. The process of claim 2 wherein said polycarbodiimide is selected from the group consisting of poly(tolyl carbodiimide), poly(4,4'-diphenylmethane carbodiimide), poly (3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide) and mixtures thereof.

4. The process of claim 3 which comprises providing a polycarbodiimide modified tractable polyamide having less than about 50 microequivalents of carboxylic acid end groups per gram of polyamide, and less than about 40 microequivalents of amine end groups.

5. A process for preparing a polycarbodiimide modified tractable polyamide of increased melt strength, shear sensitivity and relative viscosity from a mixture of a tractable polyamide and at least one polycarbodiimide which process comprises incorporating into the structure of from about 99.5 to about 95% by weight of said mixture of a tractable polyamide, having at least one carboxyl end group and at least one amine end group, and which is selected from the group consisting of polyhexamethyleneadipamide, polycaprolactam and polyhexamethylenesebacamide, from about 0.5 to about 5% by weight of said mixture of at least one polycarbodiimide which polycarbodiimide both (a) is derived from at least one aromatic diisocyanate which is either unsubstituted or contains up to one methyl substituent on each aromatic ring, and (b) contains at least three carbodiimide units per polycarbodiimide molecule, by reacting the end groups of said polyamide at a temperature not less than the melting point of the polyamide and less than the decomposition temperature of the polyamide and polycarbodiimide with the carbodiimide groups of the polycarbodiimide, said modified tractable polyamide having a melt strength ratio of $T_1/T_2$, wherein $T_1$, is the time necessary to extrude a first three inch portion of a 6 inch continuous strand of molten polyamide, and $T_2$ is the time necessary to extrude the second three inches of the 6 inch continuous strand, or less than about 1.4 at 270° C., a relative viscosity, as determined from an 11%, by solution weight of a solution of the polyamide in formic acid, of about 100 to about 500, less than about 30 micro equivalents or carboxylic acid end groups per gram of of polyamide, less than about 35 microequivalents of amine end groups per gram of polyamide and utility in extrusion applications.

6. The process of claim 5 wherein there is employed from about 1.5 to about 4% polycarbodiimide and from about 96 to about 98.5% tractable polyamide by weight of the total reaction mixture, and wherein said reaction is carried out at a temperature of from about 250° to about 290° C. and at substantially atmospheric pressure.

7. A process for preparing a polycarbodiimide modified tractable polyamide of increased melt strength, shear sensitivity and relative viscosity from a reaction mixture of a tractable polyamide and at least one polycarbodiimide, which process comprises incorporating into the structure of from about 97 to about 98.5%, by weight, of said mixture, of a tractable polyamide haing at least one carboxyl end group and at least one amine end group and which is selected from the group consisting of polyhexamethyleneadepamide, polycaprolactam and polyhexamethylenesebacamide, from about 1.5 to about 3%, by weight, of said mixture, of at least one polycarbodiimide selected from the group consisting of poly (tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide) and mixtures thereof, by reacting the end groups of said polyamide at a temperature of from about 280 to about 290° C. and at substantially atmospheric pressure, with the carbodiimide groups of the polycarbodiimide, said tractable modified polyamide having a melt strength ratio of $T_1/T_2$, wherein $T_1$, is the time necessary to extrude a first 3 inch portion of a 6 inch continuous strand of molten polyamide, and $T_2$ is the time necessary to extrude the second 3 inches of the 6 inch continuous strand, of less than about 1.2 at 270° C., a relative viscosity, as determined from an 11%, by solution weight of a solution of the polyamide in formic acid, of about 200 to about 400, less than about 20 microequivalents of carboxylic acid end groups per gram of polyamide, less than about 30 microequivalents of amine end groups per gram of polyamide and utility in extrusion applications.

8. A polycarbodiimide modified tractable polyamide having a melt strength ratio of $T_1/T_2$, wherein $T_1$ is the time necessary to extrude a first 3 inch portion of a 6 inch continuous strand of molten polyamide, and $T_2$ is the time necessary to extrude the second 3 inches of the 6 inch continuous strand, of less than about 2, a relative viscosity, as determined from an 11%, by solution weight of a solution of the polyamide in formic acid, wherein said polycarbodiimide modified tractable polyamide comprises the reaction product of (a) from about 99.5 to about 95% by weight of the total reaction mixture of a tractable polyamide, and (b) from about 0.5 to about 5% by weight of the total reaction mixture of at least one polycarbodiimide which both (1) is derived from at least one aromatic diisocyante which is either unsubstituted or contains up to one methyl substituent on each aromatic ring, and (2) contains at least three carbodiimide unit per polycarbodiimide molecule.

9. The polycarbodiimide modified tractable polyamide of claim 8 wherein said polycarbodiimide is selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly (m-phenylene carbodiimide), poly(3,3'-dimethyl-4,4'-diphenylmethane carbodiimide), and mixtures thereof.

10. A polycarbodiimide modified tractable polyamide having a melt strength ratio of $T_1/T_2$, wherein $T_1$ is the time necessary to extrude a first 3 inch portion of a 6 inch continuous strand of molten polyamide, and $T_2$ is the time necessary to extrude the second 3 inches of the 6 inch continuous strand, of less than about 1.4, a relative viscosity, as determined from an 11%, by solution weight of a solution of the polyamide in formic acid, of about 100 to about 500, less than about 30 microequivalents of carboxylic end groups per gram of polyamide and less than about 30 microequivalents of amine end groups per gram of polyamide, wherein said polycarbodiimide modified tractable polyamide comprises the reaction product of (a) from about 96 to about 98.5%, by weight of the total reaction mixture of a tractable polyamide selected from the group consisting of polyhexamethyleneadipamide, polycaprolactam and polyhexamethylenesebacamide, and (b) from about 1.5 to about 4%, by weight of the total reaction mixture of, a polycarbodiimide selected from the group consisting of poly(tolyl carbodiimide), poly(4,4'-diphenylmethane carbodiimide), and mixtures thereof.

11. The polycarbodiimide modified tractable polyamide of claim 10 wherein sad polycarbodiimide modified tractable polyamide comprises the reaction product of polyhexamethyleneadipamide and poly(4,4'-diphenylmethane carbodiimide).

12. The polycarbodiimide modified tractable polyamide of claim 11 wherein said polycarbodiimide modified tractable polyamide comprises the reaction product of from about 1.5 to about 3% polycarbodiimide and from about 97 to about 98.5% tractable polyamide by weight of the total reaction mixture.

* * * * *